United States Patent [19]

Kocher

[11] Patent Number: 4,865,073

[45] Date of Patent: Sep. 12, 1989

[54] LIQUID LEVEL CONTROL FOR REFRIGERATION SYSTEM

[75] Inventor: Erich J. Kocher, Milwaukee, Wis.

[73] Assignee: Vilter Manufacturing Corporation, Milwaukee, Wis.

[21] Appl. No.: 95,870

[22] Filed: Sep. 14, 1987

[51] Int. Cl.[4] .................. F16K 31/02; F16K 33/00
[52] U.S. Cl. ................................... 137/412; 62/131; 73/308; 73/313; 73/319; 137/428; 137/429; 137/558; 200/84 C; 251/65; 222/5/; 222/67; 307/118; 340/624; 361/178; 417/36
[58] Field of Search .................. 62/125, 129, 131; 73/308, 313, 319, 322.5; 137/386, 412, 428, 429, 558; 251/65; 200/84 C, 84 R; 307/118; 361/178; 340/624; 417/36, 40; 222/51, 64, 67, 68

[56] References Cited

U.S. PATENT DOCUMENTS

| | | | |
|---|---|---|---|
| 2,243,188 | 5/1941 | Biach | 137/428 |
| 2,448,251 | 8/1948 | Campbell | 137/429 |
| 2,820,865 | 1/1958 | McKinnies | 200/84 C |
| 2,949,126 | 8/1960 | Kuntz | 417/40 |
| 3,167,694 | 1/1965 | Bekedam | 200/84 C |
| 3,270,158 | 8/1966 | Puster | 200/84 C |
| 3,282,468 | 11/1966 | Karlen | 417/40 |
| 3,729,697 | 4/1973 | Hounsgard | 200/84 C |
| 3,992,941 | 11/1976 | McGoldrick | 73/319 |
| 4,259,975 | 4/1981 | Kinsey, Jr. et al. | 73/313 |
| 4,647,740 | 3/1987 | Hansen, III et al. | 340/624 |

FOREIGN PATENT DOCUMENTS

0072257  6/1977  Japan .................... 73/308

Primary Examiner—George L. Walton
Attorney, Agent, or Firm—James E. Nilles; Thomas F. Kirby

[57] ABSTRACT

A liquid level control in a refrigeration system operates a solenoid valve to maintain the level of liquid refrigerant in a vessel within a range defined by predetermined lower and upper liquid levels, sounds an alarm if the upper level is exceeded and stops a pump if the lower level is violated. The control comprises a float assembly and a switching assembly. The float assembly comprises a float chamber connected to the vessel, a float ball therein, a vertically extending float rod connected to the float ball and movable along a vertical path, and a pair of spaced apart stop members on the float rod disposed within the switching assembly. The switching assembly comprises a switch actuator permanent magnet, having magnet poles at opposite ends, slidably mounted on the float rod between the stop members and movable thereby along the said path. The switch assembly also comprises three switch units which are mounted so as to be vertically spaced apart from each other and adjacent the vertical path of travel of the switch actuator magnet on the float rod. The first switch unit controls a relay for operating a solenoid valve which controls liquid flow into the vessel. The second switch unit controls a relay for operating a pump which controls liquid flow out of the vessel. The third switch unit controls a relay for operating an alarm to warn of high liquid level. Each switch unit comprises a snap-acting micro-switch actuatable between two conditions (open/close), a movable lever arm for actuating the micro-switch and movable toward and away from the vertical path of travel of the actuator magnet, and a permanent switch magnet mounted on the lever arm with one magnetic pole adjacent the path. The said one magnetic pole of the switch magnet is repelled or attracted by a pole of the actuator magnet moving therepast in response to movement of the float ball and float rod to effect snap-acting operation of the switch and operation of the appropriate relay and associated electrical device.

31 Claims, 6 Drawing Sheets

LIQUID LEVEL CONTROL FOR REFRIGERATION SYSTEM

BACKGROUND OF THE INVENTION

1. Field of Use

This invention relates generally to liquid level controls which maintain the level of liquid in a vessel within a predetermined range and which perform other safety-related functions if the range is exceeded, such as operation of alarms and pumps.

In particular, it relates to a liquid level control which comprises a float assembly and a switching assembly having magnetically actuatable switches.

The invention is especially well-adapted for use in controlling the level of liquid refrigerant in a vessel, such as a low-pressure receiver, in a large refrigeration system but could have other uses.

2. Description of the Prior Art

Large refrigeration systems typically employ an evaporator, a compressor, a high pressure condenser, a high pressure receiver and a low pressure receiver located between the high pressure receiver and the evaporator. The low pressure receiver receives liquid refrigerant (such as ammonia, Freon, or the like) from the high pressure receiver through a solenoid valve and a manually adjustable expansion valve. Liquid refrigerant accumulates in the bottom of the low pressure receiver and is discharged therefrom to the evaporator through a lower outlet port either by gravity (as in a one-coil flooded evaporator system) or by means of a selectively operable motor-driven pump (as in a liquid overfeed recirculating evaporator system). Evaporated refrigerant rises to the top of the low pressure receiver and is discharged therefrom through an upper outlet port to the compressor. Changing operating conditions in the refrigeration system cause the liquid level in the low pressure receiver to fluctuate and the solenoid valve supplying liquid refrigerant to the low pressure receiver is operated (open or closed) as necessary to prevent the liquid level from dropping below or rising above predetermined low and high levels, respectively. If the liquid level rises too high, there is a danger that the liquid refrigerant will be discharged or backed-up through various ports in the low pressure receiver, as through the upper outlet port of the low pressure receiver and into the compressor, and thereby cause malfunction of or damage to the compressor. If liquid level is too low, the evaporator will not be properly supplied with refrigerant.

Various types of liquid level controls are presently employed to sense liquid levels in the low pressure receiver and to operate the solenoid valve accordingly and to operate an alarm if levels are exceeded. One prior art liquid level control, such as that shown in U.S. Patent 4,647,740, is mounted on the exterior of the vessel and comprises a float assembly and a switching assembly mounted on and above the float assembly. The float assembly comprises a float chamber which is connected by piping to the low pressure receiver so that the level of liquid in the float chamber corresponds to that in the low pressure receiver. The float assembly further comprises a float ball in the float chamber which is buoyantly supported by the liquid refrigerant therein and rises and falls with the liquid level. A float rod connected to the float ball extends vertically into the switching assembly and moves axially up and down along a vertical path as the float ball rises and falls. That portion of the float rod within the switching assembly comprises two axially (vertically) spaced apart stop members. The switching assembly comprises a magnetically attractive actuator in the form of a metal sleeve (which is not itself a magnet) which is slidably mounted on the float rod between the stop members. The switch assembly also comprises a switch unit which includes one or more proximity switches, each electric switch being mounted in a fixed position relative to the float chamber and alongside the aforesaid vertical path. The switch(es) operate equipment and/or alarms. A lever arm is provided for operating each switch and is pivotally mounted relative to the switch. A U-shaped permanent magnet is mounted on the lever arm and is disposed adjacent the path of movement of the float rod and both poles of the permanent magnet simultaneously cooperate with the metal sleeve thereon. A biasing spring is connected to the lever arm to bias the lever arm (and the associated switch) in one switching position but to enable the lever arm to be moved against spring bias to another switching position in response to magnetic attraction between both poles of the permanent magnet and the actuator sleeve. When such magnetic attraction ceases to exist, the spring biases the lever arm (and switch) back to the said one switching position. In one typical prior art arrangement, as the liquid level and float rod descend, the upper stop member eventually causes the actuator sleeve to descend out of the magnetic field of the permanent magnet thereby terminating the magnetic attraction. As this occurs, the spring pulls the lever arm away from the sleeve and causes the switch to be actuated to one position. As the liquid level and float rod rise, the lower stop member eventually causes the sleeve to rise to a position wherein magnetic attraction between both poles of the permanent magnet and the actuator sleeve pulls the lever arm against spring bias and actuates the switch to its other position. Thus, a differential is maintained between acceptably low and acceptably high liquid levels and constant recycling of the solenoid valve in response to departure from a single acceptable liquid level, as in some prior art liquid level controls, is avoided.

Prior art liquid level controls of the aforesaid character have become very complex and expensive. Provision of biasing springs of the aforedescribed character to effect switch operation when magnetic attraction terminates has added to cost and unreliability. Furthermore, because the switch is spring biased to one position, it returns to that position when the sleeve changes position and magnetic attraction ceases. Some more complex arrangements, therefore, require two such switches, one to effect switching and another to maintain a circuit energized (or de-energized) after initial switching occurs. Also, the need to provide high and-/or low liquid level alarm switches in addition to those switches which actually effect operation of solenoid valves and pumps has added to complexity and cost. Therefore, there is a need for an improved liquid level control having an improved switching assembly.

SUMMARY OF THE INVENTION

The present invention provides an improved liquid level control, especially well-adapted for use in refrigeration systems, for maintaining the level of liquid refrigerant in a vessel, such as a low pressure receiver, within a range defined by predetermined acceptable lower and upper liquid levels and to perform other safety-related functions, such as operation of an alarm and operation of pumps.

The refrigeration system disclosed herein generally comprises a compressor, a condenser, a high pressure receiver, a low pressure receiver connected to the high pressure receiver by a normally closed solenoid valve, and an evaporator connected to the low pressure receiver. A motor-driven pump circulates liquid refrigerant through the evaporator and back to the low pressure receiver which then supplies gaseous refrigerant to the compressor.

The liquid level control in accordance with the invention comprises a float assembly and a switching assembly. In the preferred embodiment disclosed, the switching assembly comprises three switch units. A first switch unit operates an electrical device such as a solenoid valve located between the high pressure and low pressure receivers to regulate the liquid level in the low pressure receiver and maintain it within a predetermined range. A second switch unit operates an electrical device such as an alarm to warn the operator that the liquid has exceeded a predetermined upper limit and there is danger that the compressor will be flooded with liquid refrigerant. A third switch unit operates an electrical device such as a pump motor for the circulation pump between the low pressure receiver and the evaporator and shuts off the motor-driven pump in the event that the liquid in the low pressure receiver drops below a predetermined lower limit and there is a risk that the evaporator will be starved of liquid refrigerant. However, a liquid level control comprising one or more switch units, instead of the three switch units disclosed, is within the scope of the invention. In the embodiment disclosed, each switch unit operates an electromagnetic relay to control the electrical device (solenoid valve, pump motor or alarm) to effect its specific function. However, the electromagnetic relay may be replaced by an integrated circuit or may be dispensed with, provided the switch unit comprises a switch of sufficient current-carrying capacity to directly operate the electrical device.

The float assembly in accordance with the invention comprises a float chamber in the form of a small vessel which is connected to receive liquid from the low pressure receiver in such a manner that the liquid level in the float chamber corresponds or is proportional to the level in the receiver. The float assembly further comprises a float ball in the space within the float chamber which rises and falls in correspondence with the liquid level in the float chamber. The float assembly also comprises a float rod or actuator rod which is connected to the float ball and preferably extends vertically from the float chamber into the switching assembly. The actuator rod is axially movable by the float ball along a vertical path. The actuator rod has a pair of axially spaced apart, adjustably positionable stop members mounted thereon. If preferred, instead of using the vertically movable float rod itself as the actuator rod, the float rod may be connected to effect axial movement (vertical or otherwise) of some other rod or member which extends into the switching assembly and which then serves as the actuator rod or member and has the stop members disposed thereon. Such other rod or member (and the stop members thereon) could move along a path which is other than vertical.

The switching assembly in accordance with the invention also comprises a switch actuator magnet, in the form of a small hollow cylindrical magnet which is slidably mounted on the actuator rod between the stop members. The opposite poles of the actuator magnet are axially spaced apart and located at opposite ends of the actuator magnet. The actuator magnet is movable along the path of movement of the actuator rod by a respective stop member in response to axial movement of the actuator rod and is adapted to effect operation of the three switch units hereinbefore referred to, as hereinafter explained.

In the broadest aspect of the invention, a switching assembly comprising only one switch unit could be used, for example, to operate a valve that regulates the liquid level in a vessel, or to operate an alarm indicative of abnormal liquid level in a vessel, or to operate a pump which affects the liquid level in a vessel.

In another aspect of the invention, a switching assembly comprising two or more switch units could be used, for example, to regulate liquid level and sound an alarm if a level is exceeded.

In the disclosed preferred embodiment of the invention, three switch units are employed to regulate liquid level, operate an alarm and operate a pump. Two switch units are spaced apart along the path of movement of the actuator rod and the third switch unit is disposed on the opposite side of the path and are axially spaced apart from one another.

Each switch unit comprises a snap-acting switch stationarily mounted relative to the float chamber and the path of the actuator rod. The switch has an actuator pin which is positively actuatable inwardly and outwardly between two conditions (open/closed), for example, or vice-versa. Each switch unit further comprises a switch lever arm which is pivotally mounted on the switch and is movable toward and away from the path of movement of the actuator rod. The switch lever arm is mechanically connected to the actuator pin for positively actuating the snap-acting switch to each condition (open or closed). The switch is constructed so that it remains in the position or condition to which it is moved, as hereinafter explained. Each switch unit also comprises a permanent switch magnet mounted on the lever arm. One pole of the switch magnet is always located closer to the path than the other pole and is located adjacent the path so as to be responsive to magnetic attraction or repulsion forces existing between it and one or the other of the end poles of the actuator magnet. As the actuator magnet moves relative to the said one pole of the switch magnet, it effects movement of the lever arm to one or the other of its two positions and effects actuation of the switch to either open or closed condition.

In the embodiments of the invention wherein more than one switch unit is employed, the switch magnets of the several switch units may be axially spaced apart from one another along the path of movement of the actuator member. In addition to such axial spacing, the several switch units may be mounted on different sides of the path of the actuator member so as to provide sufficient mounting and operating space for each. In the embodiment disclosed, for example, the first switch unit controls liquid level as the liquid level rises and falls within its normal range; the second switch unit controls the alarm; and the third switch unit controls the pump motor and stops the pump if the liquid level drops below a predetermined lower level.

The actuator magnet, with its poles at opposite ends, can effect either attraction or repulsion of the switch magnet in a switch unit and thus effect positive opening or closing operation of the associated snap-acting switch. Since the switch is snap-acting, it remains in the last position into which it is thrown by one pole of the actuator magnet on the actuator rod and does not move from that position until acted upon by the opposite pole of the actuator magnet as the latter is moved to some other position by the stop members on the actuator rod.

A liquid level control in accordance with the present invention offers several important advantages over the prior art. For example, the switching assembly can employ one or more switch units to provide for a variety of control functions of various kinds. Control functions disclosed herein include liquid level solenoid valve control, alarm control and pump control. Each switch unit is complete in itself and is easily mounted in an appropriate location adjacent the path of movement of the actuator magnet. One switch unit can be mounted above, below or opposite another switch unit thereby making economical use of available space. Each switch unit employs a snap-acting switch which does not move from one condition to another unless positively moved thereto by the presence of the actuator magnet in a certain position, i.e., the switch is not spring-biased to a certain position to which it returns when magnetic force is withdrawn. This enables a wider range of positive and precise control functions to be employed and manipulated, as compared to prior art switches which are biased into one condition and return thereto when no longer subjected to a magnetic field, whatever its polarity. The switch units employed are simple in construction and mode of operation than prior art switch units and are more economical, compact, reliable and versatile than in the prior art. Other objects and advantages of the invention will hereinafter appear.

DESCRIPTION OF PREFERRED EMBODIMENTS

General Arrangement

Figure 1:
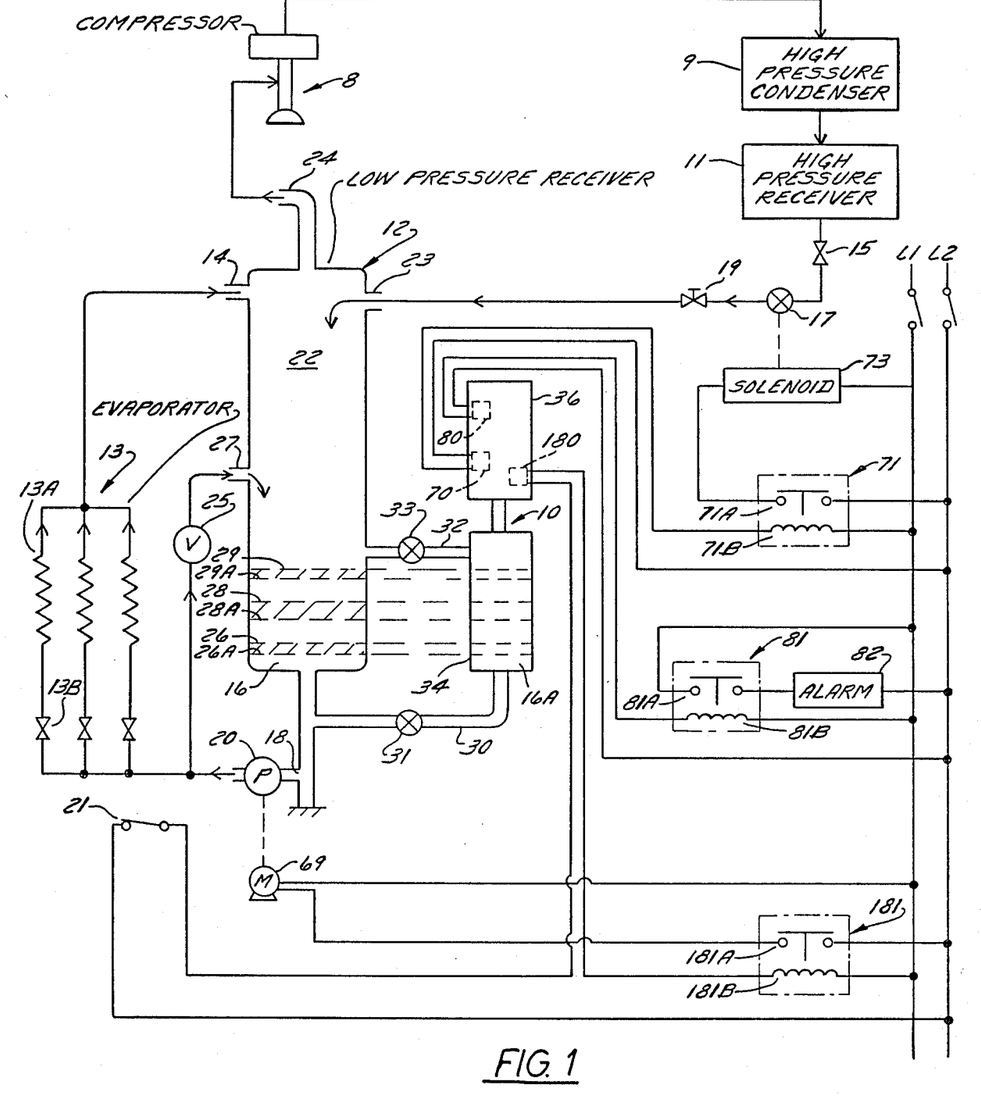
FIG. 1 is a schematic diagram of a portion of a refrigeration system having an improved liquid level control in accordance with the present invention.

FIG. 1 schematically shows a portion of a refrigeration system, a liquid level control 10 therefor in accordance with the present invention and electric circuitry for the control.

The refrigeration system includes a gas compressor 8, a high pressure condenser 9, a high pressure receiver 11, a low pressure receiver or vessel 12 and an evaporator 13. Compressor 8 supplies a compressed refrigerant vapor (such as ammonia, Freon or the like) to condenser 9. Condenser 9 supplies liquid refrigerant to high pressure receiver 11. High pressure receiver 11 supplies liquid refrigerant to low pressure receiver 12 wherein some of it evaporates. Low pressure receiver 12 supplies liquid refrigerant to evaporator 13. Most of the liquid refrigerant supplied to evaporator 13 is evaporated therein and both liquid and gaseous refrigerant are returned to low pressure receiver 12. The gaseous portion 22 of refrigerant in low pressure receiver 12 is discharged to compressor 8, whereas the liquid portion 16 settles to the bottom of receiver 12 to be recirculated to evaporator 13.

Low pressure receiver 12 has an upper liquid inlet port 23 and liquid refrigerant is supplied thereto from high pressure receiver 11 through a king valve 15, a solenoid operated fill valve 17 (controlled by a solenoid 73) and a manually adjustable expansion valve 19. Receiver 12 has an upper gas outlet port 24 for supplying gaseous refrigerant to compressor 8. Receiver 12 has a lower outlet port 18 from which liquid refrigerant is supplied by means of a recirculation pump 20 driven by an electric motor 69 to the inlet side of evaporator 13. Receiver 12 has an upper gas inlet port 14 for receiving gaseous refrigerant from the outlet side of evaporator 13. Evaporator 13 is shown as comprising a plurality of (three) evaporator coils 13A, each provided with an expansion valve 13B, but could take other forms. A pressure relief valve 25 is connected between the outlet side of pump 20 and a liquid inlet port 27 in the side of receiver 12.

Referring to FIG. 1, changing operating conditions in the refrigeration system cause the level of liquid 16 in low pressure receiver 12 to rise and fall. Liquid level control 10 and its associated electric circuitry is provided to operate (i.e., open and close) fill valve 17 to maintain the liquid level within a predetermined range defined by a predetermined lower level 28A and a predetermined upper level 28. Liquid level control 10 also operates to stop pump 20 when the liquid level drops below predetermined low level 26 to a dangerously low level 26A. Liquid level control 10 also operates to turn on an alarm 82 to warn if the level of liquid 16 rises above predetermined upper level 28 to a dangerously high level 29 in the event of a system or control malfunction.

Fill valve 17 is normally closed and can be selectively opened by energizing solenoid 73 to admit liquid refrigerant to low pressure receiver 12. Pump 20 is normally in continuous operation to admit liquid refrigerant to evaporator 13 and can be selectively stopped by de-energizing moor 69 to interrupt liquid flow to evaporator 13, if the supply of liquid 16 in low pressure receiver 12 is temporarily insufficient to support continuous flow and drops to dangerously low level 26A. Alarm 82 is normally off (i.e., de-energized) but turns on when level 28A is reached or exceeded.

Liquid Level Control

Figures 2, 3, 4, 5, 6:
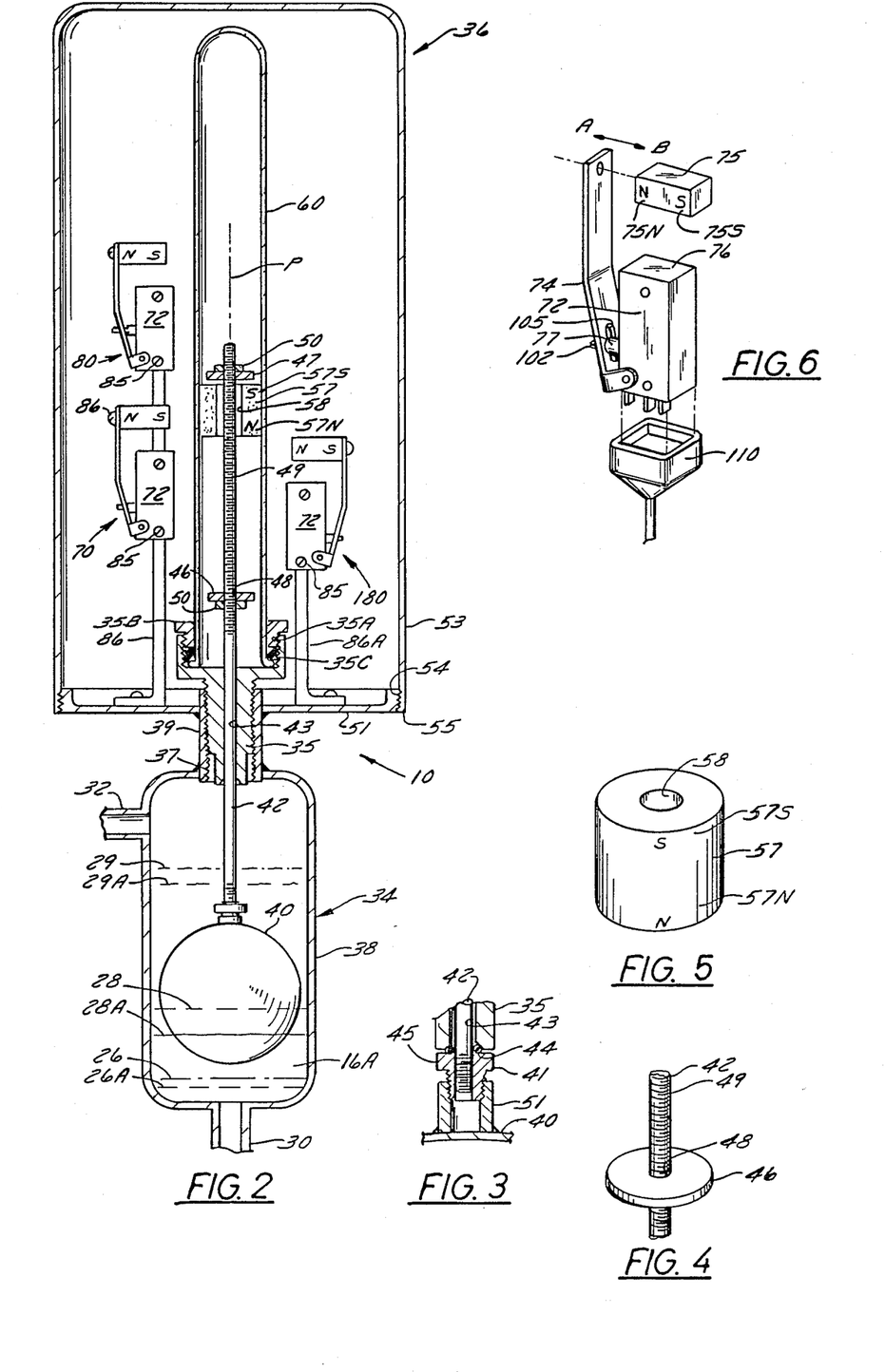
FIG. 2 is an enlarged side elevation view, partly in crosssection, of the liquid level control of FIG. 1 and shows the float assembly and the switching assembly thereof.
FIG. 3 is an enlarged cross-section view of a detail of the float ball shown in FIG. 2.
FIG. 4 is an enlarged perspective view of a portion of the float rod and a stop member of the float assembly of FIG. 2.
FIG. 5 is an enlarged perspective view of the actuating magnet of the switching assembly of FIG. 2.
FIG. 6 is an enlarged perspective view of one of the switch units of the switching assembly of FIG. 2.

Referring to FIGS. 1 and 2, liquid level control 10, which comprises a float assembly 34 and a switching assembly 36, is mounted in a fixed position on receiver 12 by two rigid pipes 30 and 32. Pipe 30 supplies refrigerant to float assembly 34 of liquid level control 10 from receiver 12. The pipes 30 and 32 are provided with manually operable shut-off valves 31 and 33, respectively, to isolate the control, if need be.

Float Assembly

Referring to FIGS. 2 through 6, float assembly 34 comprises a float chamber or vessel 38, a float ball 40 and a float rod 42. Float chamber 38 is connected to pipes 30 and 32 so that the level of liquid 16A in chamber 38 corresponds to the level of liquid 16 in receiver 12. Float ball 40 takes the form of a hollow metal sphere which is bouyantly supported by the liquid 16A and rises and falls therewith. Float rod 42, which is connected to float ball 40 and extends into switching assembly 36, is axially movable up and down with the float ball along a vertical path P (FIG. 2).

More specifically, float chamber 38 is provided with a hole 37 at its upper end in which a hollow internally threaded coupling 39 is mounted as by welding. A gauge glass mounting nut 35 is threadedly secured in coupling 39 and supports a hollow gauge glass or tube 60 which is closed at its upper end and has its open lower end secured by threads 35A, a gland nut 35B, and an O-ring 35C to nut 35. Rod 42 slidably extends through a hole 43 in nut 35 into gauge glass 60. Gauge glass 60 prevents refrigerant from escaping from float chamber 38 and thereby maintains the fluid-tight integrity of the refrigeration system.

As FIG. 2 shows, coupling 39 at the upper end of float chamber 38 has a flange 51 which is welded thereto and mechanically supports switching assembly 36. A transparent protective hollow cylindrical plastic housing 53, closed at one end, is mounted on flange 51 to protect gauge glass 60 and the components of switching assembly 36. Housing 53 is secured to flange 51 by internal threads 54 on the inside of housing 53 which engage external threads 55 on the peripheral edge of flange 51.

As FIG. 3 shows, the lower end of rod 42 is externally threaded and is threadedly secured in a locknut 41 which, in turn, is threadedly secured in an internally threaded coupling 51 which is secured to float ball 40 as by welding. Locknut 41 carries a resilient "O" ring 44 in a groove 45 which performs two functions: to seal opening 43 in gauge glass mounting nut 35 against refrigerant flow therethrough in the event that the liquid refrigerant 16A in float chamber 38 boils (as occasionally happens) and the float ball 40 is thrust upward, and to serve as a shock absorber to prevent damage to the fragile float ball 40 resulting from contact with mounting nut 35 as ball 40 is forcibly thrust upward in response to such boiling.

As FIG. 2 shows, float rod 42 has a pair of axially spaced apart, adjustably positionable lower and upper stop members 46 and 47, respectively, thereon. As FIGS. 2 and 4 show, lower stop member 46, which is identical to upper stop member 47, takes the form of a round nut having a threaded bore 48 by means of which it is screwed onto a threaded portion 49 of float rod 42 to a desired position with respect to tube 60. Preferably, stop nuts 50 (FIG. 2) are associated with the stop members 46 and 47 to maintain them in desired fixed positions. Rod 42, stop members 46 and 47, and stop nuts 50 are made of non-magnetizable material such as stainless steel.

Switching Assembly

Referring to FIGS. 1 and 2, switching assembly 36 of control 10 comprises three switching units 70, 80 and 180. Each switching unit comprises a snap-acting switch 72 which has a pivotally movable switch actuating lever arm 74 thereon, with a permanent magnet 75 secured to the lever arm as by a screw 86. The switch 72 of each switch unit 70, 80 and 180 is actuatable by an actuator magnet 57 on float rod 42, as hereinafter explained. Actuator.magnet 57 is a hollow cylindrical magnet having an axial hole 58 therethrough for slidably accommodating float rod 42 and is disposed between the stop members 46 and 47 on float rod 42. Actuator magnet 57 has an actuator magnet south pole 57S at its upper end and an actuator magnet north pole 57N at its lower end. The actuator magnet poles 57S and 57N cooperate with the south pole 75S switch magnet 75 to effect switch operation.

The three switching units are disposed on the outside of glass tube 60 and are adjacent but spaced from path P. The switch units 70 and 80 are supported in vertically spaced apart relationship on one side of path P on a support bracket 86 by set screws 85 to enable each switch unit to be easily moved to the optimum position. The switch unit 180 is supported on a support bracket 86A by set screws 85 and is located on the opposite side of path P and slightly below switch unit 70.

Switch unit 70 controls a fill valve relay 71 for the solenoid 73 of fill valve 17. Normally open relay contact 71A is connected in series with solenoid 73 across the power lines L1 and L2. Relay coil 71B is connected in series with normally open snap-acting switch 72 of switch unit 70 across power lines L1 and L2.

Switch unit 80 controls an alarm relay 81 for alarm 82. Normally open relay contact 81A is connected in series with alarm 82 across power lines L1 and L2. Relay coil 81B is connected in series with normally open snap-acting switch 72 of switch unit 80 across power lines L1 and L2.

Switch unit 180 controls a pump relay 181 for pump motor 69 of pump 20. Normally open relay contact 181A is connected in series with motor 69 across power lines L1 and L2. Relay coil 181B is connected in series with normally closed snap-acting switch 72 of switch unit 180 and with a temperature thermostat or temperature responsive switch 21 across power lines L1 and L2. Thermostat 21 is associated with evaporator 13 and is normally closed (except as hereinafter explained) to enable pump 20 to run continuously to maintain evaporator temperature below a certain temperature, as long as at least one evaporator coil 13A requires refrigerant.

Switch Units

Referring to FIGS. 2, 6, 7 and 8, each switch 72 is a snap-acting micro-switch comprising a plastic switch housing 76 having integrally formed external pivot pins 85 (FIG. 6) on which the lower end of switch actuating lever arm 74 is pivotally mounted. Permanent magnet 75 (hereinafter referred to as switch magnet 75) is rigidly secured to the other end of lever arm 74 by means of screw 86. Movement of switch magnet 75 toward and away from path P (i.e., between two positions) effects corresponding movement of lever arm 74 and corresponding actuation of switch 72. Switch magnet 75 takes the form of a bar magnet having its opposite magnetic poles (75N and 75S) located at opposite ends thereof. In the embodiment shown in FIG. 2, in switch units 70 and 80, the one end which is always closer to path P than the other end is the south pole 75S and the other end is the north pole 75N. In switch unit 180, however, switch magnet 75 is reversed so that the north pole 75N is always closer to path P.

Figure 7:
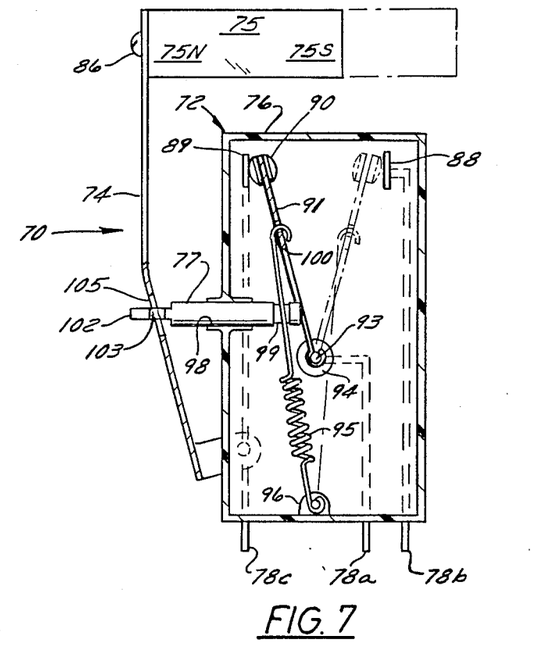
FIG. 7 is an enlarged cross-section view of the switch unit of FIG. 6 showing in detail the snap-acting switch and the means for positively connecting the switch lever arm to the push button switch actuator of the snap-acting switch.
Figure 8:
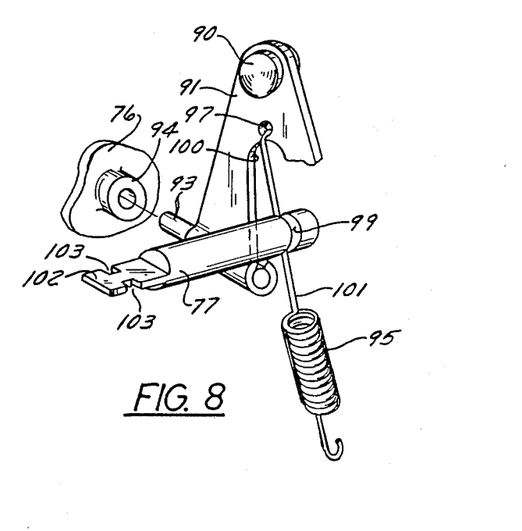
FIG. 8 is an enlarged perspective view of the switch components shown in FIG. 7.

Lever arm 74 is mechanically connected to an axially movable switch actuator member 77 which is slidably mounted in a hole 98 in a side wall of switch housing 76. The outer end of actuator 77 has a tongue 102 with notches 103 in its opposite edges which engage the sides of an elongated slot 105 formed in switch lever arm 74. This arrangement enables pivotal movement of lever arm 74 effected by its magnet 75 to effect axial movement of actuator 77.

As FIG. 7 shows, electric switch 72 comprises a pair of stationary switch contacts 88 and 89 which are electrically connected to the switch connection terminals 78b and 78c, respectively. Each contact 88 and 89 is alternately engageable by a movable switch contact 90 which is electrically connected to a switch connection terminal 78a. Contact 90 is mounted on a plate 91 which is movable by switch actuator 77. The inner end of actuator 77 has a slot 99 therein in which a relatively unbendable portion 101 of an overcenter spring 95 is engaged. Plate 91 has a cutout portion 100 which accommodates passage of actuator 77 and spring portion 101 as plate 91 moves overcenter in either direction. A connector or plug 110, shown in FIG. 6, is provided to electrically connect switch 72 into the electric circuit shown in FIG. 1. Plate 91, which carries movable contact 90, is supported for pivotal movement between spaced apart stationary contacts 88 and 89 on two pins 93 which are supported on bosses, such as boss 94 in FIG. 8, formed on the inside of opposite side walls of switch housing 76. The overcenter biasing spring 95 (helical tension type) has one end anchored to the inside of the lower end wall at a point 96 aligned with the pivot pin 93 of plate 91. The other end of spring 95 is connected to plate 91 in a hole 97 near the free end of plate 91. Spring 95 is an overcenter spring and operates to bias and maintain plate 91 into whichever of two positions into which it is thrown by switch actuator 77.

In FIGS. 2, 5 and 6, switch magnet 75, lever arm 74, pushbutton actuator 77 and movable switch contact 90 of switch 72 are shown in a switch position or condition wherein movable contact 90 is engaged with stationary contact 89 and is out of engagement with stationary contact 88. The contacts will remain so until movable contact 90 positively moves to a switch condition wherein movable contact 90 engages stationary contact 88. This will occur when lever arm 74 is moved from position A to position B, as indicated by the arrow in FIG. 6, in response to the presence of pole 57N of actuator magnet 57 moving adjacent switch magnet pole 75S. Furthermore, switch magnet 75, lever arm 74, actuator 77 and movable switch contact 90 will remain in condition B until they are positively moved to condition A in response to the presence of pole 57S of actuator magnet 57 moving adjacent switch magnet pole 75S.

In other words, switch 72 (with the switch magnet pole 75S arranged as shown in FIGS. 2 and 7) will only be actuated in response to the interaction between the south pole 75S of switch magnet 75 and the upper south pole 57S (repulsion) or the lower north pole 57N (attraction) of cylindrical actuator magnet 57, respectively. Magnetic repulsion between the south pole 75S of switch magnet 75 and the upper south pole 57S of actuator magnet 57, when they are adjacent each other, causes switch magnet 75 and lever arm 74 to move away from path P to actuate switch 72 to one condition. Conversely, magnetic attraction between the south pole 75S of switch magnet 75 and the lower north pole 57N of actuator magnet 57 when they are adjacent each other causes switch magnet 75 and lever arm 74 to move toward path P to actuate switch 72 to its other condition.

It is apparent from the preceding description of switch 72 that its switch terminals 78a, 78b and 78c can be connected in a variety of ways. Furthermore, its switch magnet 75 can be attached to lever arm 74 so as to place either pole 75S or 75N closer to path P1. Similarly, actuator magnet 57 can be placed float rod 42 with either pole 57S on top (as shown) or with pole 57N on top. The arrangements and combinations selected will determine whether a switch 72 in a switch unit 70, 80 or 180 will be "open" or "closed" in any given set of circumstances. Therefore, for purposes of the following description of operation (and not by way of limitation) the following assumptions will be made.

In switch unit 70, switch pole 75S is always closer to path P than pole 75N; only contact terminals 78a and 78c are in use; and the contacts 89 and 90 are "closed" when the switch magnet 75 has been repulsed to switch condition A (away from path P); and the fill valve 19 is open.

In alarm switch unit 80, switch pole 75S is closer to path P than pole 75N; only contact terminals 78a and 78b are in use; and the contacts 88 and 90 are "open" when switch magnet 75 has been repulsed to switch condition A (away from path P), and the alarm 82 is off.

In pump switch unit 180, switch magnet pole 75N is always closer to path P than pole 75S; only contact terminals 78a and 78c are in use; and the contacts 89 and 90 are "closed" when the switch magnet 75 has been repulsed to switch condition A (away from path P).

Operation

Figure 14:
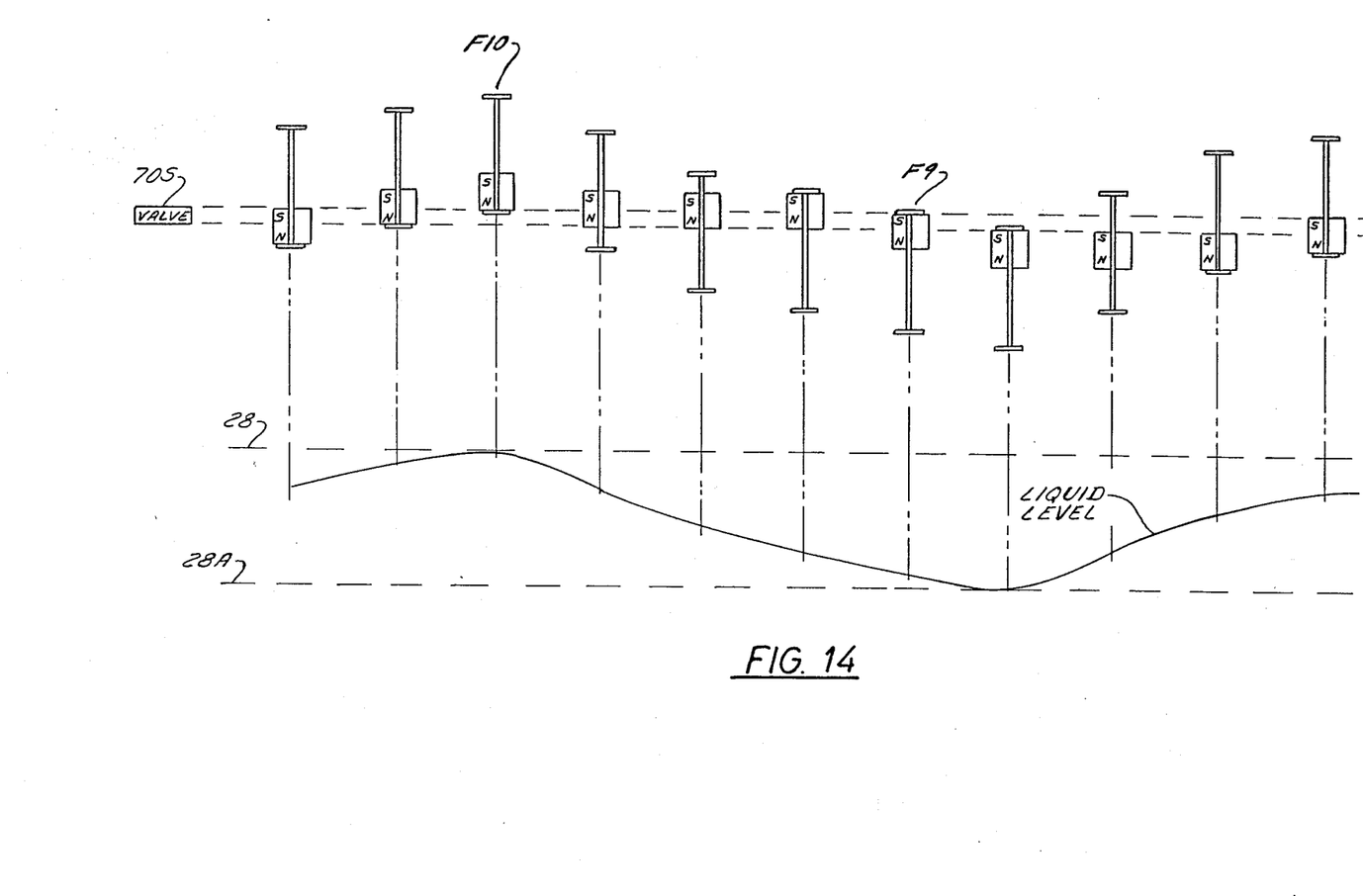
FIG. 14 is a schematic diagram depicting a typical normal cycle of operation of the liquid level control.
Figure 15:
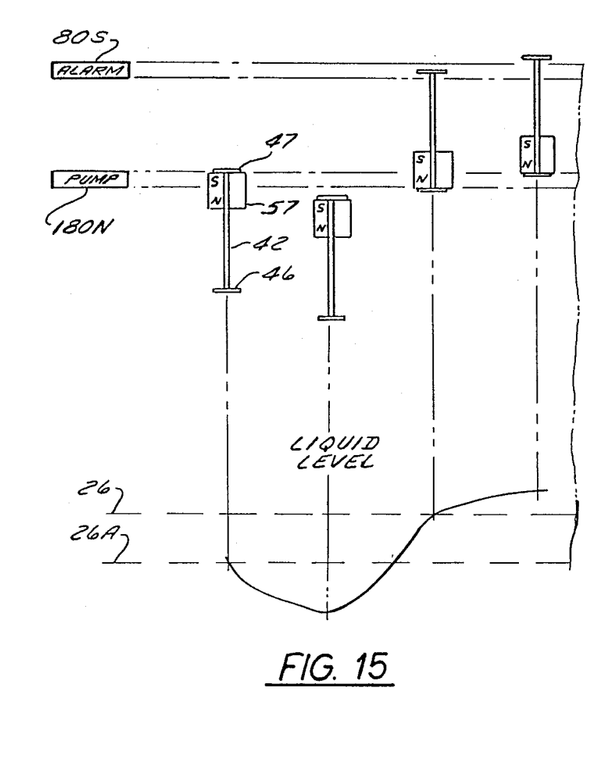
FIG. 15 is a schematic diagram depicting a typical emergency low level cycle of operation of the liquid level control.
Figure 16:
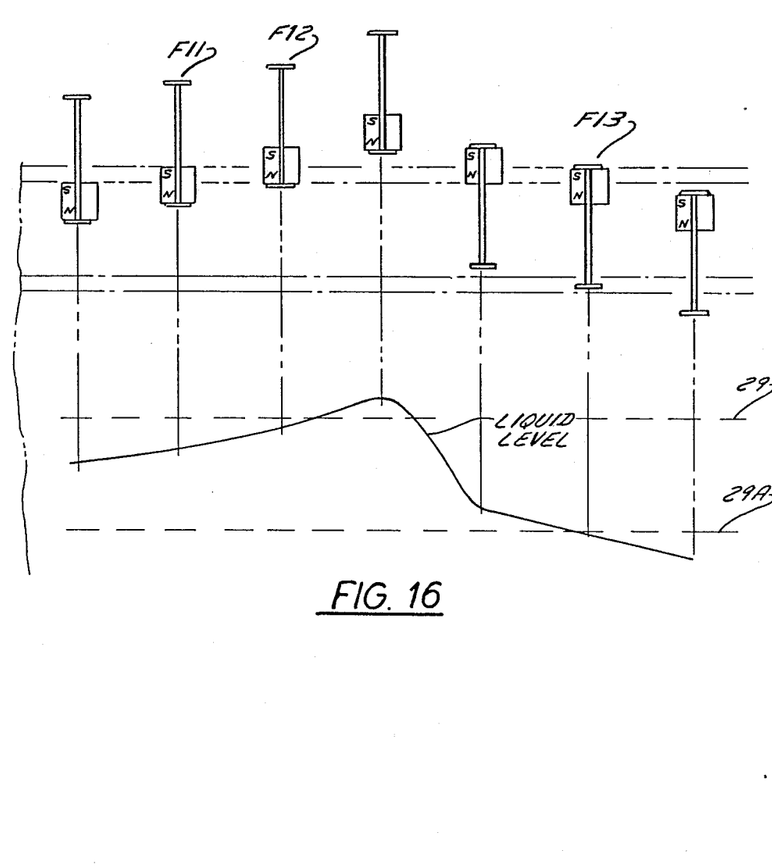
FIG. 16 is a schematic diagram depicting a typical emergency high level cycle of operation of the liquid level control.

FIGS. 14, 15 and 16 schematically depict, respectively, a typical normal cycle, an emergency low level cycle and an emergency high level cycle. FIG. 14 shows the relationship of south pole 70S of switch magnet 75 of switch unit 70 to the actuator magnet poles 57S and 57N and the resultant condition of fill valve 17 during one typical normal cycle of operation when the liquid level cycles between upper level 28 and lower level 28A.

FIG. 15 shows the relationship of north pole 70N of switch magnet 75 of switch unit 180 to the actuator magnet poles 57S and 57N and the resultant condition of pump 20 when the liquid level cycles between lower level 26 and lowest level 26A.

FIG. 16 shows the relationship of south pole 70S of switch magnet 75 of switch unit 80 to the actuator magnet poles 57S and 57N and the resultant condition of alarm 82 when the liquid level cycles between upper level 29 and highest level 29A.

Figure 9:
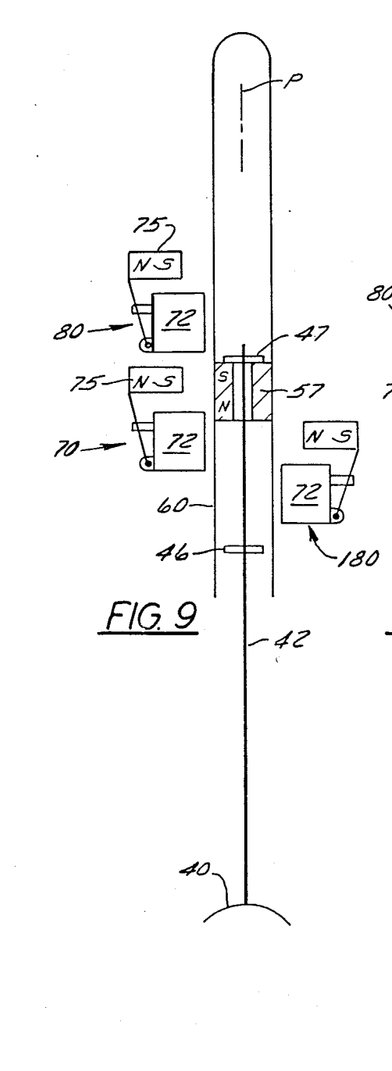
FIGS. 9 through 13 are schematic views of the liquid level control of FIG. 2 and show the components thereof in various stages of operation.
Figure 10:
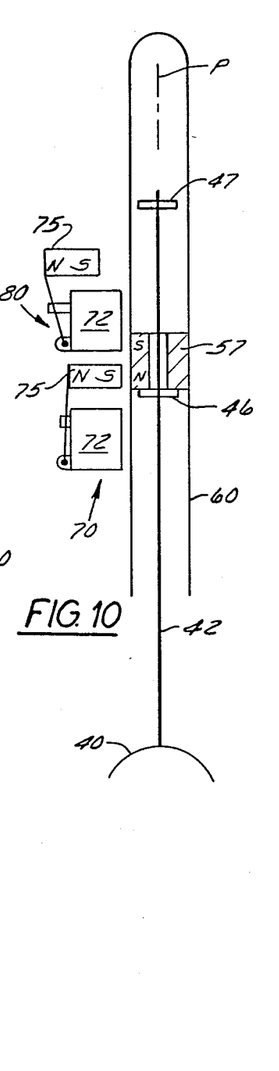
Figure 11:
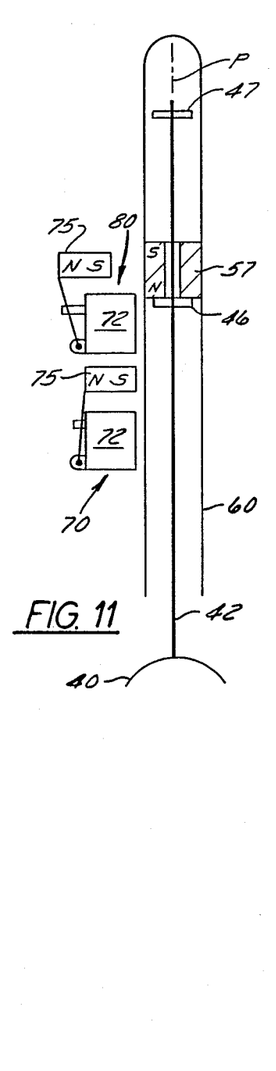
Figure 12:
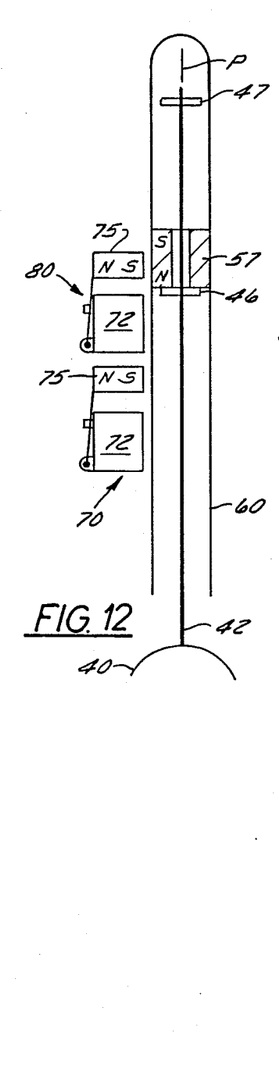
Figure 13:
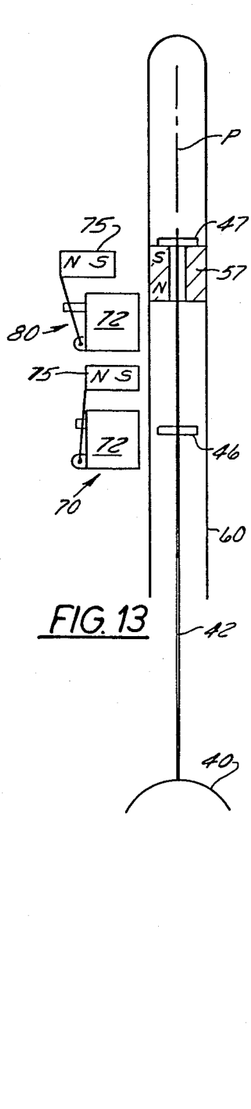

To facilitate understanding in FIG. 14, the two schematically depicted stations designated F9 and F10 are more completely depicted in FIGS. 9 and 10, respectively. In FIG. 16, the three schematically depicted stations F11, F12 and F13 are more completely depicted in FIGS. 11, 12 and 13, respectively.

In each of FIGS. 14, 15 and 16 (not to scale), the relative positions of the operative magnet pole of the switch magnet 75 of the switch units 180, 70 and 80 are depicted and these magnets are designated 180N, 70S and 80S, respectively. The dashed lines extending from the switch magnets enable the positions of the actuator magnet 57 to be compared thereto. When an actuator magnet pole 57S or 57N registers between the dashed lines, it indicates that repulsion or attraction exists between an actuator magnet pole (57S or 57N) and an associated switch magnet pole (S or N), depending on the polarity of the switch magnet pole. After a switch magnet 75 is repulsed or attracted by one pole of the actuator magnet 57, the associated switch 72 assumes a switch condition (open or closed, as the case may be) and remains in that condition even after the actuator magnet 57 is moved away from the switch magnet 75 by a stop member 46 or 47 on float rod 42. The switch remains in the condition thus assumed until it is positively moved to its other condition by the other pole of the actuator magnet 57.

In connection with FIGS. 9 through 16, assume that actuator magnet pole 57S repulses switch magnet pole 70S to open switch 72 of fill valve switch unit 70 and thereby close fill valve 17. Conversely, actuator magnet pole 57N attracts switch magnet pole 70S to close switch 72 of fill valve unit 70 and thereby opens fill valve 17.

Also, assume that actuator magnet pole 57N repulses switch magnet pole 180N to close switch 72 of pump switch unit 180 and thereby operates pump 20. Conversely, actuator magnet pole 57S attracts switch magnet pole 180N to open switch 72 of pump switch unit 180 and thereby stops pump 20.

Further, assume that actuator magnet pole 57S repulses switch magnet pole 80S to open switch 72 of alarm switch unit 80 and thereby turns off alarm 82. Conversely, actuator magnet pole 57N attracts switch magnet pole 80S to close switch 72 of alarm switch unit 80 and thereby turns on alarm 82.

As FIG. 14 shows, when the compressor system is running under stable conditions, the level of liquid in receiver 12 is maintained within the range defined by lower level 26 and upper level 28. Switch 72 of pump switch unit 180 is closed and pump 20 is in operation to supply liquid refrigerant to evaporator 13. Switch 72 of alarm switch unit 80 is open and alarm 82 is off. When system conditions change so as to cause the liquid level to reach or depart from the levels 28 and 28A of the defined range, the following sequences can occur.

Referring to FIG. 14, if the liquid level drops to lower level 28A, fill valve 17 opens to allow refrigerant to flow from high pressure receiver 11 into low pressure receiver 12. Pump 20 continues to run. Fill valve 17 remains open until the liquid level rises to upper level 28, whereupon fill valve 17 closes. Pump 20 continues to run. The cycle of opening and closing of fill valve 17 continues as necessary to maintain the liquid level between the range defined by levels 28 and 28A.

Referring now to FIG. 15, if a malfunction occurs (such as failure of valve 17 to open) and the liquid level drops below lower level 26 to a lowest level 26A, pump 20 stops running and a low level alarm (if provided) is actuated. The operator takes necessary action to correct the malfunction, such as to effect re-opening of fill valve 17. When the liquid level rises from lowest level 26A to low level 26, pump 20 restarts. Fill valve 17 remains open until the liquid level reaches upper level 28, whereupon fill valve 17 closes.

Referring now to FIG. 16, if another malfunction occurs (such as failure of valve 17 to close) and the liquid level rises above upper level 28 and reaches highest level 29, high level alarm 82 is actuated. The operator takes necessary action to correct the malfunction, such as to effect re-closure of fill valve 17. When the liquid level drops from highest level 29 to high level 29A, alarm 82 is deactivated.

I claim:

1. A control responsive to the position of a reciprocably movable object (40) to effect operation of a transducer (73, 69) which regulates the position of said object (40), said control comprising:

a non-magnetizable actuator member (42) which is reciprocably movable along a path (P) in response to reciprocable movement of said object (40);

a pair of non-magnetizable stop members (46, 47) on said actuator member (42) and spaced apart from each other in the direction of said path (P);

an actuator magnet (57) mounted on said actuator member (42) and movable relative thereto between said pair of stop members (46, 47) in the direction of said path (P), said actuator magnet (57) having magnet holes (57S, 57N) of opposite polarity which are spaced apart from each other in the direction of said path (P), each of said stop members (46, 47) being operable in response to axial movement of said actuator member (42) to effect axial movement of said actuator magnet (57);

an electric switch (72) mounted in a fixed position adjacent the path (P) of movement of said actuator magnet (57) and operable to effect operation of said transducer (73, 69) said electric switch (72) being actuatable between two switching conditions; and a switch magnet (75) being reciprocably movable transversely to said path (P) between two positions and connected to actuate said switch (72), said switch magnet (75) having magnet poles (S, N) of opposite polarity and being disposed so that only one pole thereof is in a position to cooperate with either pole (57S, 57N) of said actuator magnet (57) when the latter moves adjacent thereto;

said switch magnet (75) being movable to one position to actuate said switch (72) to one switching condition when said one pole thereof responds to the magnetic force between it and one magnetic pole (57S, 57N) of said actuator magnet (57) adjacent thereto, said switch magnet (75) being movable to and remaining in said one position when one of said stop members (46, 47) effects movement of said one magnetic pole (57S, 57N) of said actuator magnet (57) adjacent said one pole of said switch magnet (75); and said switch magnet (75) being movable from said one position to its other position to actuate said switch (72) to its other switching condition only when said one pole thereof responds to the magnetic force between it and the other magnetic pole (57S, 57N) of said actuator magnet (57) adjacent thereto, said switch magnet (75) being movable to and remaining in said other position when one of said stop members (46, 47) effects movement of said other magnetic pole (57S, 57N) of said actuator magnet (57) adjacent said one pole of said switch magnet (75).

2. A liquid level control according to claim 1 wherein said actuator magnet (57) is slidably mounted on said actuator member (42) between said stop members (46, 47).

3. In a liquid level control having an actuator member (42) movable in response to a change in the level of liquid (16A) in a vessel (38), in combination:
a pair of stop members (46, 47) mounted on said actuator member (42) in spaced apart relationship to one another and being movable by said actuator member (42) along a path (P);
an actuator magnet (57) having magnet poles (57S, 57N) of opposite polarity spaced apart from one another in the direction of said path (P);
said actuator magnet (57) being disposed between said pair of stop members (46, 47) and being relatively movable with respect thereto, as well as being movable thereby along said path (P), each of said stop members (46, 47) being operable in response to axial movement of said actuator member (42) to effect axial movement of said actuator magnet (57);
and a switch unit (70, 80, 100) comprising a switch magnet (75) and an electric switch (72),
said switch magnet (75) being movable in opposite directions transversely to said path (P) and having one magnet pole (N, S) which is always closer to said path (P) than its other magnet pole,
said switch magnet (75) being movable in response to the attraction or repulsion forces between its said one magnet pole (N, S) and whichever magnet pole (57S, 57N) of said actuator magnet (57) is proximate to said one magnet pole (N, S) to effect actuation of said switch (72),
said switch magnet (75) being movable to and remaining in said one position when one of said stop members (46, 47) effects movement of said one magnetic pole (57S, 57N) of said actuator magnet (57) adjacent said one pole of said switch magnet (75), said switch magnet (75) being movable to and remaining in said other position when one of said stop members (46, 47) effects movement of said other magnetic pole (57S, 57N) of said actuator magnet (57) adjacent said one pole of said switch magnet (75);
said electric switch (72) being actuatable between two conditions in response to movement of said switch magnet (75),
said electric switch (72) being adapted to remain in whichever condition to which it has been actuated until it is actuated to its other condition in response to a magnetic force between said switch magnet (75) and said actuator magnet (57).

4. A liquid level control according to claim 3 including a plurality of said switch units (70, 80, 180), each switch unit including a switch magnet (75) which cooperates with said actuator magnet (57).

5. A liquid level control according to claim 3 wherein at least two switch magnets (75) are disposed in spaced apart relationship from each other adjacent said path (P).

6.. A liquid level control according to claim 3 wherein at least two switch magnets (75) are disposed in spaced apart relationship from each other on different sides of said path (P).

7. A liquid level control according to claim 6 wherein at least two switch magnets (75) are disposed in spaced apart relationship adjacent said path (P).

8. A liquid level control according to claim 3 or 4 or 5 or 6 or 6 wherein each switch unit (70, 80, 180) comprises a movable switch lever arm (74) for actuating its associated switch (72) and wherein each switch magnet (75) is mounted on an associated switch lever arm (74).

9. A liquid level control according to claim 8 wherein each switch (72) is a snap-acting switch having a push-button (77) thereon and wherein its associated switch lever arm (74) is pivotally connected to its associated push-button (77).

10. A liquid level control according to claim 9 wherein each lever arm (74) is pivotally mounted on its associated switch (72).

11. A control responsive to the level of liquid (16A) in a vessel (34) to effect operation of an electrical device (73, 82, 69) comprising:
a rod (42) for axial movement along a path (P) in response to said level of liquid (16A) and having a pair of axially spaced apart stop members (46, 47) thereon;
an actuator magnet (57) slidably mounted on said rod (42) between said spaced apart stop members (46, 47) and movable thereby along said path (P) in response to movement of said rod (42), each of said stop members (46, 47) being operable in response to axial movement of said actuator member (42) to effect axial movement of said actuator magnet (57);
and a switch unit (70, 80, 180) comprising:
a snap-acting switch (72) stationarily mounted relative to said rod (42) and actuatable between two conditions to effect operation of said electrical device (73, 82, 69);
a lever arm (74) for actuating said snap-acting switch (72) and movable toward and away from said path (P) to actuate said snap-acting switch (72);
and a switch magnet (75) mounted on said lever arm (74) and adjacent said path (P) and responsive to magnetic attraction and repulsion forces between said switch magnet (75) and said actuator magnet (57) as said actuator magnet (57) assumes various positions along said path (P) relative to said switch magnet (75) to effect movement of said lever arm (74) to actuate said snap-acting switch (72) to one of said two conditions when magnetic attraction forces occur, and to actuate said snap-acting switch (72) to the other of said two conditions when magnetic repulsion forces occur,
said snap-acting switch (72) remaining in that condition to which actuated in response to one of said magnetic forces until actuated to its other condition in response to the other of said magnetic forces, said switch magnet (75) being movable to and remaining in said one position when one of said stop members (46, 47) effects movement of said one magnetic pole (57S, 57N) of said actuator magnet (57) adjacent said one pole of said switch magnet (75); and said switch magnet (75) being movable to and remaining in said other position when one of said stop members (46, 47) effects movement of said other magnetic pole (57S, 57N) of said actuator magnet (57) adjacent said one pole of said switch magnet (75).

12. A control according to claim 11 further comprising a plurality of switch units (70, 80, 180) adapted to effect operation of a plurality of different electrical devices (73, 82, 69), each switch unit comprising a switch magnet (75) responsive said actuator magnet (57).

13. A control according to claim 12 wherein the switch magnets (75) of said switch units (70, 80, 180) are axially spaced from each other along said path (P).

14. A control according to claim 12 wherein said switch magnets (75) of said switch units (70, 180) are disposed on different sides of said path (P).

15. A control according to claim 12 wherein the switch magnets (75) of at least two switch units (70, 80) are axially spaced apart from each other along said path (P) and wherein the switch magnets (75) of at least two switch units (70, 180) are disposed on different sides of said path (P).

16. A control according to claim 11 wherein said electrical device operates to regulate the level of liquid in said vessel.

17. A control according to claim 16 wherein said electrical device is a solenoid valve (73, 17).

18. A control according to claim 16 wherein said electrical device is a pump (69).

19. A control according to claim 12 wherein said different electrical devices are selected from a class of devices which consist of: devices (73, 17, 69) which operate to regulate the level of liquid in said vessel (38) and devices (82) which operate an alarm indicative of a predetermined level.

20. A control according to claim 12 wherein said plurality of different electrical devices comprise a solenoid valve (73, 17), a pump (69) and an alarm (82).

21. A control response to the level of liquid (16A) in a vessel (38) to effect operation of a plurality of electrical devices comprising:
a rod (42) for axial movement along a path (P) in response to said level of liquid and having a pair of axially spaced apart stop members (46, 47) thereon;
an actuator magnet (57) slidably mounted on said rod (42) between said spaced apart stop members (46, 47) and movable thereby along said path (P) in response to movement of said rod (42), said actuator magnet (57) having magnetic poles (57S, 57N) of opposite polarity spaced apart from each other in the direction of said path (P), each of said stop members (46, 47) being operable in response to axial movement of said actuator member (42) of effect axial movement of said actuator magnet (57);
and a plurality of switch units (70, 80, 180), each switch unit comprising:
a snap-acting switch (72) stationarily mounted relative to said rod (42) and actuatable between two conditions to effect operation of one of said electrical devices;
a lever arm (74) for actuating said snap-acting switch (72) and movable toward and away from said path to actuate said snap-acting switch (72);
and a switch magnet (75) mounted on said lever arm (74) and adjacent said path (P) and responsive to magnetic attraction and repulsion forces between said switch magnet (75) and a magnetic pole (57S, 57N) of said actuator magnet (57) as said actuator magnet (57) assumes various positions along said path (P) relative to said switch magnet (75) to effect movement of said lever arm (74) to actuate said snap-acting switch (72) to one of said two conditions when magnetic attraction forces occur and to actuate said snap-acting switch (72) to the other of said two conditions when magnetic repulsion forces occur,
said snap-acting switch (72) remaining in that condition to which actuated in response to one of said magnetic forces until actuated to its other condition in response to the other of said magnetic forces, said switch magnet (75) being movable to and remaining in said one position when one of said stop members (46, 47) effects movement of said one magnetic pole (57S, 57N) of said actuator magnet (57) adjacent said one pole of said switch magnet (75), said switch magnet (75) being movable to and remaining in said other position when one of said stop members (46, 47) effects movement of said other magnetic pole (57S, 57N) of said actuator magnet (57) adjacent said one pole of said switch magnet (75);
a first one of said switch units (70 or 180) being connectable to effect operation of an electrical device (17 or 69) which operates to regulate the level of liquid in said vessel (38);
and a second one of said switch units (80) being connectable to effect operation of an electric device (82) which provides an alarm indicative of a predetermined liquid level being reached;
the switch magnets (75) of said first and second ones of said switch units being axially spaced apart from each other in the direction of said path (P).

22. A control according to claim 21 wherein said electrical device connectable to said first switch unit (70) comprises a solenoid valve (73, 17):
wherein said electrical device connectable to said second switch unit (80) comprises an alarm (82);
and wherein said plurality of switch units further comprises a third one of said switch units (180) connectable to effect operation of a pump (20) to regulate the level of liquid in said vessel (38), the switch magnets (75) of said first and third ones of said switch units (70 and 180) being axially spaced apart from each other in the direction of said path.

23. A control according to claim 22 wherein said solenoid valve (17, 73) controls admission of liquid to said vessel (38) and wherein said pump (20) controls expulsion of liquid from said 24. A system comprising:
a vessel for containing liquid;
electrical means (73, 69) operable to regulate the level of liquid in said vessel;
and a liquid level control for operating said device;
said liquid level control comprising:
an actuator member (42) movable in response to a change in the level of liquid in said vessel;
a pair of stop members (46, 47) mounted on said actuator member (42) in spaced apart relationship to one another and being movable by said actuator member (42) along a path (P);
an actuator magnet (57) having magnet poles (57S, 57N) of opposite polarity spaced apart from one another in the direction of said path (P),
said actuator magnet (57) being disposed between said pair of stop member (46, 47) and being relatively movable with respect thereto, as well as being movable thereby along said path (P), each of said stop members (46, 47) being operable in response to axial movement of said actuator member (42) to effect axial movement of said actuator magnet (57);

and a switch unit (70, 80) comprising a switch magnet (75) and an electric switch (72) connected to operate said electrical means (73, 69), said switch magnet (75) being movable in opposite directions transversely to said path (P) and having one magnet pole (S) which is always closer to said path (P) than its other magnet pole (N), said switch magnet (75) being movable in response to the attraction or repulsion forces between its said one magnet pole (S) and whichever magnet pole (57S, 57N) of said actuator magnet (57) is proximate to said one magnet pole (N) to effect actuation of said switch (72), said switch magnet (75) being movable to and remaining in said one position when one of said stop members (46, 47) effects movement of said one magnetic pole (57S, 57N) of said actuator magnet (57) adjacent said one pole of said switch magnet (75), said switch magnet (75) being movable to and remaining in said other position when one of said stop members (46, 47) effects movement of said other magnetic pole (57S, 57N) of said actuator magnet (57) adjacent said one pole of said switch magnet (75);

said electric switch (72) being actuatable between two conditions in response to movement of said switch magnet (75) to effect operation of said electrical means (73, 69), said electric switch (72) being adapted to remain in whichever condition to which it has been actuated until it is actuated to its other condition in response to a magnetic force between said one magnet pole (N) of said switch magnet (75) and a pole (57S, 57N) of said actuator magnet (57).

25. A system according to claim 24 wherein said liquid level control includes a plurality of said switch units (70, 80, 180), each switch unit including a switch magnet (75) which cooperates with said actuator magnet (57), at least one of said switch units (70, 180) being connected to operate said electrical means.

26. A system according to claim 25 wherein said switch magnets (75) of said switch units (70, 80, 180) are axially spaced from each other along said path (P).

27. A system according to claim 25 wherein said switch magnets (75) of said switch units (70, 80, 180) are disposed on different sides of said path (P).

28. A system according to claim 25 wherein the switch magnets (75) of at least two switch units (70, 80) are axially spaced apart from each other along said path (P) and wherein the switch magnets (75) of at least two switch units (70, 180) are disposed on different sides of said path (P).

29. A system according to claim 24 or 25 or 26 or 27 or 28 wherein said electrical means includes a solenoid valve (17, 73).

30. A system according to claim 24 or 25 or 26 or 27 or 28 wherein said electrical means includes a pump (69, 20).

31. A control according to claim 24 wherein said electrical means includes devices which are selected from a class of devices which consists of: devices (17, 73 and 20, 69) which operate to regulate the level of liquid in said vessel (38) and devices (82) which operate an alarm indicative of a predetermined level.

* * * * *